(12) United States Patent
Wetzel

(10) Patent No.: US 11,014,444 B2
(45) Date of Patent: May 25, 2021

(54) CAPLESS CLOSURE ASSEMBLY FOR FUEL-TANK FILLER PIPE

(71) Applicant: Stant USA Corp., Connersville, IN (US)

(72) Inventor: Paul C. Wetzel, Oxford, OH (US)

(73) Assignee: STANT USA CORP., Connersville, IN (US)

( * ) Notice: Subject to any disclaimer, the term of this patent is extended or adjusted under 35 U.S.C. 154(b) by 0 days.

(21) Appl. No.: 16/514,037

(22) Filed: Jul. 17, 2019

(65) Prior Publication Data

US 2020/0361309 A1    Nov. 19, 2020

Related U.S. Application Data

(60) Provisional application No. 62/847,499, filed on May 14, 2019.

(51) Int. Cl.
| | | |
|---|---|---|
| *B60K 15/04* | (2006.01) | |
| *F16K 31/528* | (2006.01) | |
| *B60K 15/03* | (2006.01) | |

(52) U.S. Cl.
CPC .......... *B60K 15/04* (2013.01); *F16K 31/5282* (2013.01); *B60K 2015/03019* (2013.01); *B60K 2015/03026* (2013.01); *B60K 2015/0477* (2013.01)

(58) Field of Classification Search
CPC .......... B60K 15/04; B60K 2015/03026; B60K 2015/03019; B60K 2015/0477; F16K 31/5282
See application file for complete search history.

(56) References Cited

U.S. PATENT DOCUMENTS

| | | |
|---|---|---|
| 6,189,581 B1 | 2/2001 | Harris et al. |
| 6,431,228 B2 | 8/2002 | Foltz et al. |
| 6,691,750 B1 | 2/2004 | Foltz |
| 6,732,840 B2 | 5/2004 | Ikeda et al. |
| 6,755,057 B2 | 6/2004 | Foltz |
| 7,882,862 B2 | 2/2011 | DeCapua et al. |
| 10,000,117 B2 | 6/2018 | Giles et al. |
| 10,065,496 B2 | 9/2018 | Frank et al. |
| 10,226,996 B2 | 3/2019 | Giles et al. |
| 2013/0213963 A1* | 8/2013 | Chretien .................. B67D 7/06 220/86.2 |
| 2014/0346171 A1 | 11/2014 | Yamamoto et al. |
| 2015/0048087 A1 | 2/2015 | Hagano et al. |
| 2016/0009173 A1 | 1/2016 | Sperando et al. |
| 2016/0048087 A1 | 2/2016 | Yang et al. |
| 2017/0072790 A1 | 3/2017 | Frank et al. |
| 2017/0158048 A1* | 6/2017 | Giles ....................... B60K 15/04 |
| 2019/0023125 A1 | 1/2019 | Costa et al. |

FOREIGN PATENT DOCUMENTS

KR    2019990003290 U    1/1999

* cited by examiner

*Primary Examiner* — Jason K Niesz
(74) *Attorney, Agent, or Firm* — Barnes & Thornburg LLP

(57) ABSTRACT

A capless filler pipe closure is provided for a tank filler pipe. The capless closure permits a fuel pump nozzle to be inserted into the tank filler pipe without first removing a fuel cap from the outer end of the tank filler pipe.

20 Claims, 7 Drawing Sheets

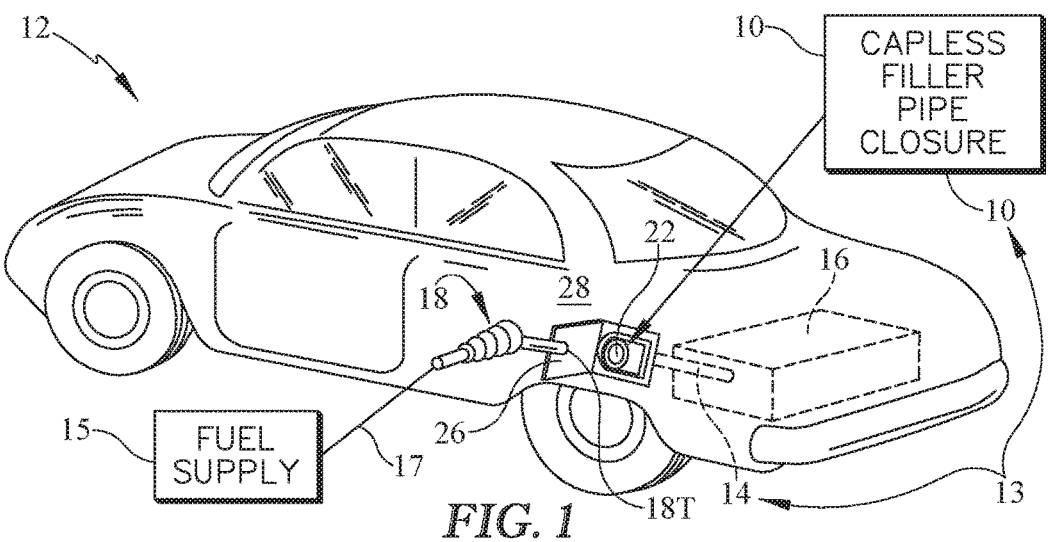
*FIG. 1*
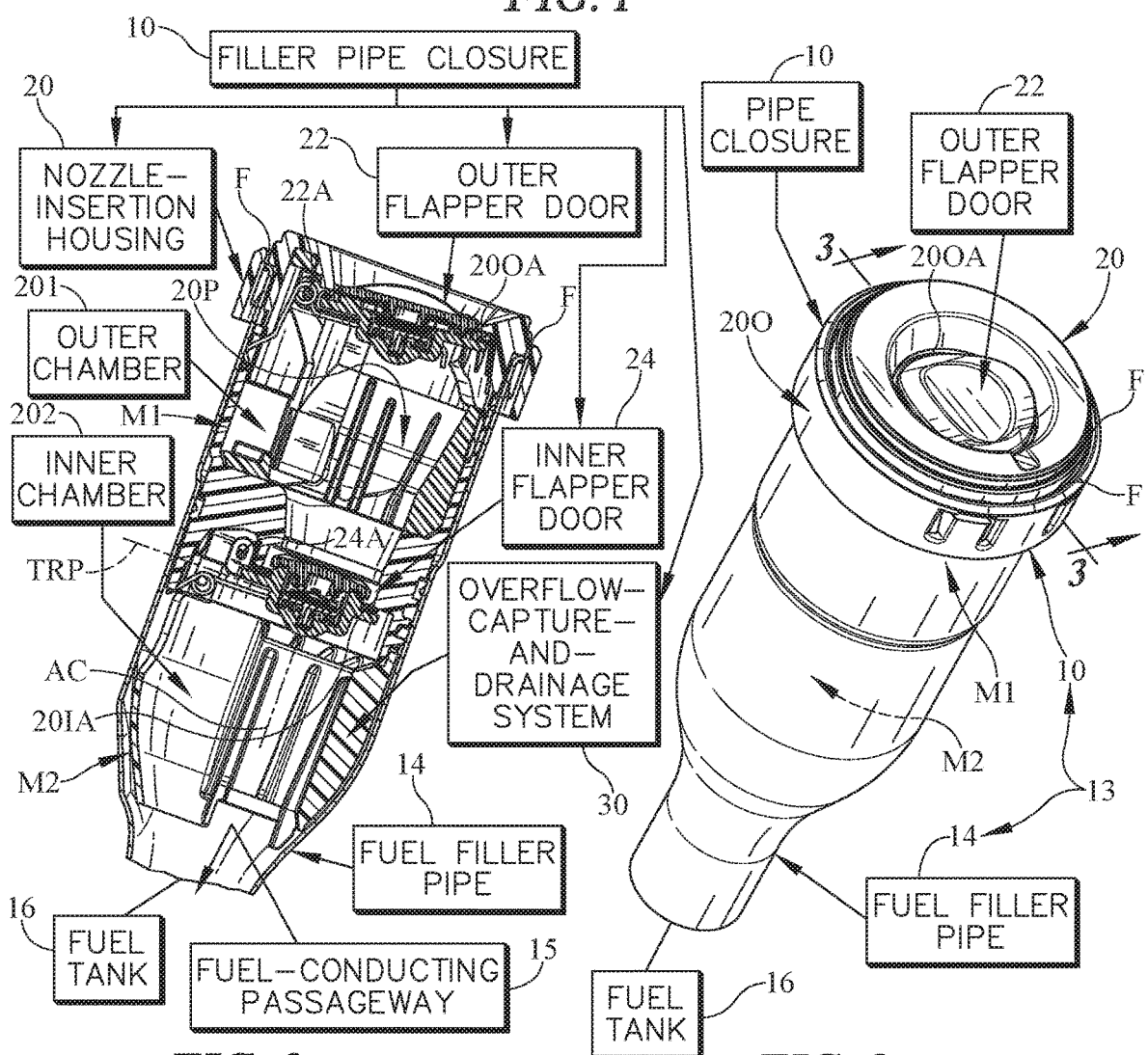
*FIG. 3*
*FIG. 2*

CAPLESS CLOSURE ASSEMBLY FOR FUEL-TANK FILLER PIPE

PRIORITY CLAIM

This application claims priority under 35 U.S.C. § 119(e) to U.S. Provisional Application No. 62/847,499, filed May 14, 2019, which is expressly incorporated by reference herein.

BACKGROUND

The present disclosure relates to a filler pipe closure for a tank filler pipe. More particularly, the present disclosure relates to a capless closure that permits a fuel-dispensing pump nozzle to be inserted into a tank filler pipe to supply fuel to a fuel tank and closes the tank filler pipe when the fuel-dispensing pump nozzle is removed from the closure.

Many vehicles include a fuel tank, a fuel-tank filler pipe coupled to the fuel tank to communicate liquid fuel from a fuel-dispensing pump nozzle to the fuel tank, and a closure coupled to the fuel-tank filler pipe to seal the fuel-tank filler pipe. During refueling, the fuel-dispensing pump nozzle is passed by a user first through an outer chamber associated with an outer end of the fuel-tank filler pipe that is open to the atmosphere and then through a nozzle-receiving aperture into a fuel-conducting passageway formed in the fuel-tank filler pipe. Then the pump nozzle is actuated by the user to cause liquid fuel discharged by the pump nozzle to flow through the fuel-conducting passageway into the fuel tank.

SUMMARY

According to the present disclosure, a fuel-tank filler apparatus comprises a filler pipe closure that is adapted to be coupled to a fuel-tank fuel filler pipe. In illustrative embodiments, the filler pipe closure is a capless system that includes a nozzle-insertion housing that is configured to mate with an outer end of a fuel filler pipe to provide a fill tube that leads to a vehicle fuel tank. The nozzle-insertion housing is formed to include an outer nozzle-receiving aperture opening into an outer chamber and an inner nozzle-receiving aperture that is located to interconnect the outer chamber in fluid communication with an inner chamber that communicates with a fuel-conducting passageway formed in the fuel filler pipe when the nozzle-insertion housing is mated with the outer end of the fuel filler pipe.

During refueling, in illustrative embodiments, the tip of a fuel-dispensing pump nozzle is moved by a user to open an outer flapper door associated with the outer chamber. The nozzle tip is then passed through the outer chamber and the inner nozzle-receiving aperture to engage the normally closed inner flapper door and move the inner flapper door against a closing force applied by a companion spring to assume the opened position. The nozzle tip is then moved past the inner flapper door into the inner chamber that communicates with the fuel-conducting passageway formed in the fuel filler pipe. The pump nozzle may then be actuated by the user to dispense fuel into the fuel-conducting passageway that leads to the fuel tank.

In illustrative embodiments, the capless filler pipe closure includes an outer module formed to include the outer nozzle-receiving aperture and an inner module formed to include the inner nozzle-receiving aperture. The outer module is sized to extend into the fuel-conducting passageway of the fuel filler pipe and is configured to include a movable outer flapper door that is arranged normally to close the outer nozzle-receiving aperture. The inner module is sized to lie in the fuel-conducting passageway of the fuel-filler pipe and configured to include a movable inner flapper door that is arranged normally to close the inner nozzle-receiving aperture and to lie in a position that is below and in spaced-apart relation to the outer module.

In illustrative embodiments, the outer module includes an outer section formed to include the outer nozzle-receiving aperture, a separate middle section, and an outer door-pivot pin. The outer door-support pin is coupled to the middle section to support the movable outer flapper door for pivotable movement from a closed position closing the outer nozzle-receiving aperture to an opened position opening the outer nozzle-receiving aperture.

In illustrative embodiments, the outer section of the outer module includes a center portion formed to include the outer nozzle-receiving aperture and a rim portion arranged to surround the center portion and trap an outer end of the fuel filler pipe therebetween when the outer section is mounted on the fuel filler pipe. The outer section also includes a series of frangible break-away segments coupled at one end to the center portion and at another end to the rim portion.

In illustrative embodiments, the inner module includes an inner section and an inner door-support pin that is coupled to the inner section to support the movable inner flapper door for pivotable movement from a closed position closing the inner nozzle-receiving aperture to an opened position opening the inner nozzle-receiving aperture. The center portion of the outer section includes a downwardly extending strip that is interposed between the middle section of the outer module and the inner section of the inner module. A laser weld is also included in the fill pipe closure and used to join the downwardly extending strip of the center portion of the outer section to the inner section.

Additional features of the present disclosure will become apparent to those skilled in the art upon consideration of the following detailed description of illustrative embodiments exemplifying the best mode of carrying out the present disclosure as presently perceived.

BRIEF DESCRIPTION OF THE DRAWINGS

The detailed description particularly refers to the accompanying figures in which:

FIG. 1 is a perspective view showing an outer filler-pipe access door moved to an opened position relative to a vehicle body panel to expose an illustrative capless filler pipe closure that is coupled to a fuel filler pipe leading to a vehicle fuel tank and showing a fuel-dispensing pump nozzle that is coupled to a fuel supply and configured to be inserted into the capless filler pipe closure during vehicle refueling to discharge liquid fuel into the fuel filler pipe leading to the vehicle fuel tank;

FIG. 2 is an enlarged perspective view of the capless filler pipe closure of FIG. 1 coupled to the fuel filler pipe to provide a fill tube for a fuel tank and showing an exposed portion of a nozzle-insertion housing that is coupled to an outer end of the fuel filler pipe and formed to include an outer nozzle-receiving aperture and also showing a pivotable outer flapper door closing the outer nozzle-receiving aperture;

FIG. 3 is a sectional view taken along line 3-3 of FIG. 1 of a fuel-tank filler apparatus in accordance with the present disclosure showing an illustrative nozzle-insertion housing mounted in the outer end of a fuel filler pipe, and showing that the capless filler pipe closure further includes a spring-loaded nozzle-actuated outer flapper door located in an outer end of the nozzle-insertion housing and yieldably biased to assume a closed position closing an outer nozzle-receiving aperture formed in the nozzle-insertion housing, a spring-loaded inner flapper door yieldably biased to assume a closed position closing an inner nozzle-receiving aperture formed in an inner section of the nozzle-insertion housing and arranged to lie in spaced-apart relation to the outer flapper door to define an outer chamber of the nozzle-insertion housing, and an overflow-capture-and-drainage system configured in accordance with the present disclosure to conduct any overflow liquid fuel extant in the nozzle-insertion housing into a fuel-conducting passageway formed in the fuel filler pipe for delivery to the fuel tank;

DETAILED DESCRIPTION

Figure 3A:
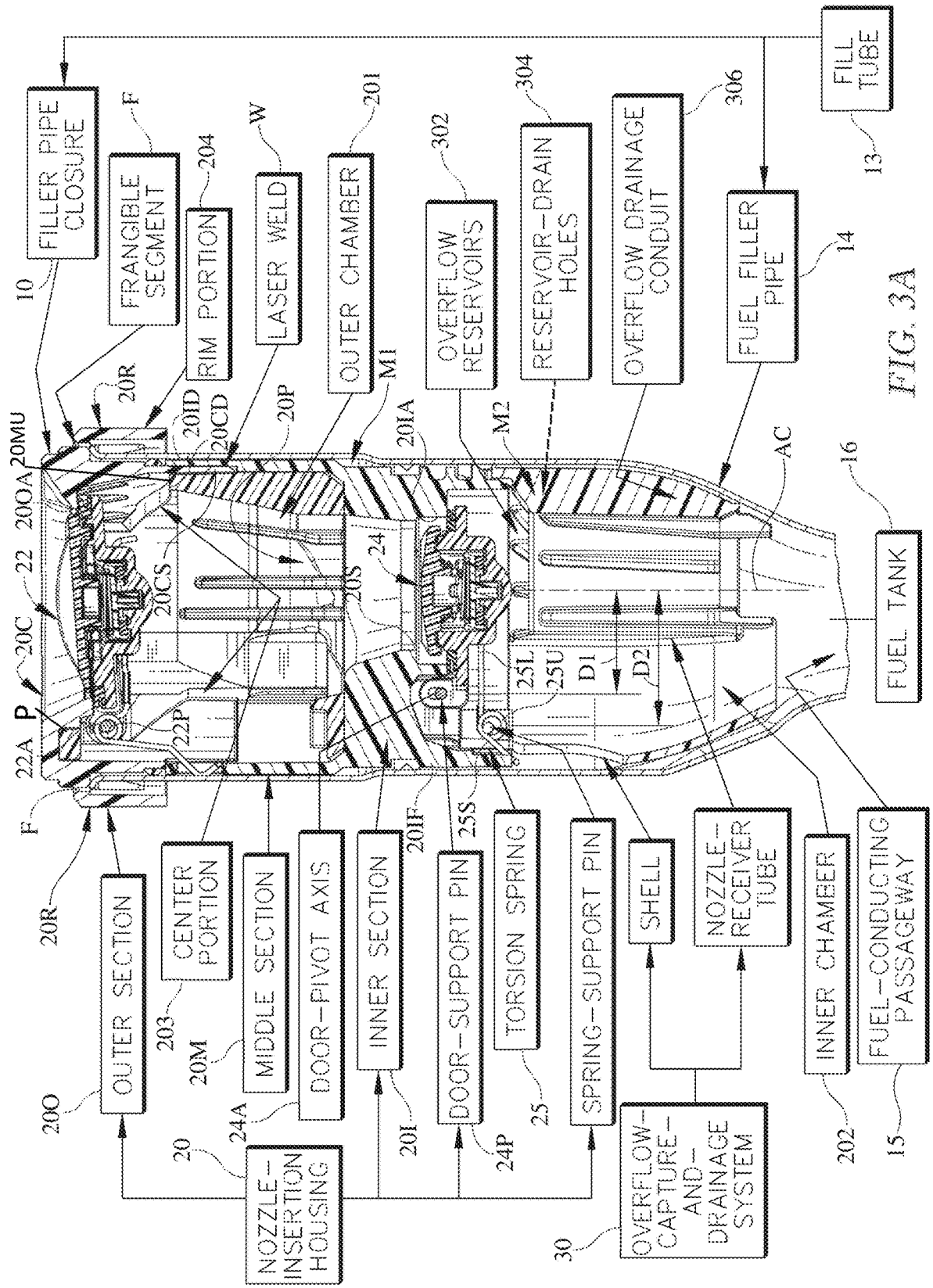
FIG. 3A is an enlarged view of FIG. 3 showing that (1) an outer section of the nozzle-insertion housing is formed to include a center portion, a rim portion arranged to surround the center portion and trap an outer end of the fuel filler pipe therebetween, and a series of frangible circumferentially spaced-apart break-away segments coupled at one end to the center portion and at another end to the rim portion, (2) a laser weld is used to join the center portion of the outer section of the nozzle-insertion housing to an inner section of the nozzle-insertion housing that is used to support the pivotable inner flapper door, (3) the pivotable inner flapper door is configured and arranged to include a hidden leading door edge to minimize damage to the pivotable inner flapper door as a fuel-dispensing pump nozzle is inserted into the capless filler pipe closure to dispense liquid fuel into a fuel-conducting passageway formed in the fuel filler pipe and arranged to lead to a fuel tank, (4) a spring-support pin used to support a torsion spring associated with the inner flapper door is decoupled from a door-pivot axis of the pivotable inner flapper door to locate the door-pivot axis of the pivotable inner flapper door between the door-pivot axis of the pivotable outer flapper door and the spring-support pin associated with the inner flapper door, and (5) the liquid-fuel overflow-capture-and-drainage system is arranged and configured to manage collection and drainage of any overflow liquid fuel.

A capless filler pipe closure 10 is provided in a vehicle 12 to close a fuel filler pipe 14 extending from a fuel tank 16 onboard vehicle 12 and to accept a fuel-dispensing pump nozzle 18 during fuel tank refueling as suggested in FIG. 1. Filler pipe closure 10 cooperates with fuel filler pipe 14 to define a fill tube 13 for conducting liquid fuel from nozzle 18 to fuel tank 16. Pump nozzle 18 is coupled to a fuel supply 15 by a hose 17.

Capless filler pipe closure 10 is configured to close off fuel filler pipe 14 from the atmosphere until fuel-dispensing pump nozzle 18 is inserted into closure 10. Filler pipe closure 10 includes a nozzle-insertion housing 20 coupled to an outer end of fuel filler pipe 14 as suggested in FIGS. 2 and 3. Nozzle-insertion housing 20 is formed to include a passageway 20P that extends in an outer chamber 20I of nozzle-insertion housing from an outer nozzle-receiving aperture 20OA to an inner nozzle-receiving aperture 20IA as suggested in FIGS. 3, 3A, and 3B. During fuel tank refueling, a user inserts the fuel-dispensing pump nozzle 18 into passageway 20P in nozzle-insertion housing 20 until a distal tip 18T of nozzle 18 extends into an inner chamber 20₂ of nozzle-insertion housing 20 and communicates with a fuel-conducting passageway 15 formed in fuel filler pipe 14 to transfer fuel discharged by nozzle 18 to fuel tank 16 through fuel filler pipe 14.

Filler pipe closure 10 also includes outer and inner flapper doors 22, 24 located inside nozzle-insertion housing 20 along nozzle-receiving passageway 20P as suggested in FIG. 3. A spring-loaded outer flapper door 22 is mounted on a middle section 20M of nozzle-insertion housing 20 as suggested in FIG. 3A for pivotable movement about an outer door-pivot axis 22A when engaged by the tip 18T of moving fuel-dispensing pump nozzle 18. A spring-loaded inner flapper door 24 is mounted on an inner section 20I of nozzle-insertion housing 20 as suggested in FIG. 3A for pivotable movement about an inner door-pivot axis 24A when engaged by the moving nozzle tip 18T.

Figure 3B:
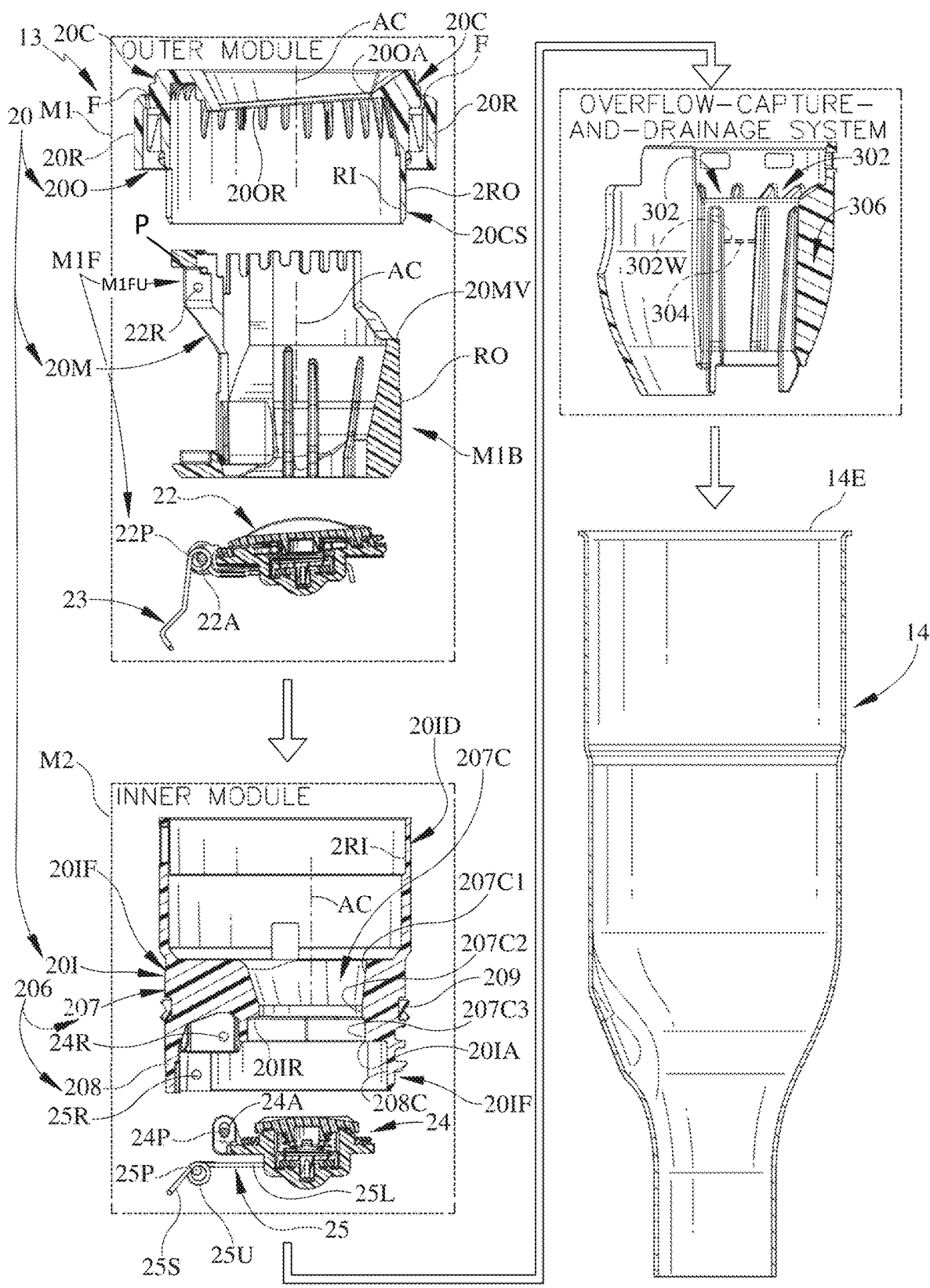
FIG. 3B is an exploded assembly view of the component shown in FIG. 3A suggesting (1) that outer and middle sections of the nozzle-insertion housing cooperate with a spring-loaded outer flapper door to form an outer module of the filler pipe closure, (2) that an inner section of the nozzle-insertion housing cooperates with a spring-loaded inner flapper door to form an inner module of the filler pipe closure, and (3) an overflow-capture-and-drainage system of the filler pipe closure is arranged to lie under the inner and outer modules when the components are assembled as shown in FIG. 3A.

Nozzle-insertion housing 20 includes an outer section 20O, a middle section 20M, and an inner section 20I as shown, for example in FIGS. 3A and 3B. An outer section 20O of nozzle-insertion housing 20 is visible to an observer as seen in FIG. 2. Outer section 20O is arranged to lie in axially spaced-apart relation to inner section 20I to locate middle section 20M between inner and outer sections 20I, 20O as suggested in FIGS. 3, 3A, and 3B.

Capless filler pipe closure 10 of fill tube 13 is exposed to receive a tip 18T of fuel-dispensing pump nozzle 18 during vehicle tank refueling as suggested in FIG. 1. An access door 26 is mounted for pivotable movement relative to a body panel 28 of vehicle 12 to an opened position as suggested in FIG. 1 to expose an outer flapper door 22 and provide access to capless filler pipe closure 10 during refueling activities.

Nozzle-insertion housing 20 also includes an outer door-support pin 22P that is configured to extend into a pin receiver 22R formed in middle section 20M of nozzle-insertion housing 20 as suggested in FIGS. 3A and 3B to support outer flapper door 22 for pivotable movement about an outer door-pivot axis 22A between opened and closed positions. In the closed position, outer flapper door 22 mates with an axially inwardly facing annular rim 20O to form a boundary of outer nozzle-receiving aperture 20OA included in outer section 20O as suggested in FIG. 3A or 3B.

Nozzle-insertion housing 20 also includes an inner door-support pin 24P that is configured to extend into a pin receiver 24R formed in inner section 20I of nozzle-insertion housing 20 as suggested in FIGS. 3A and 3B to support inner flapper door 24 for pivotable movement about an inner door-pivot axis 24A between opened and closed positions. In the position, inner flapper door 24 mates with an axially inwardly facing annular rim 20IR included in middle section 20M to form a boundary of inner nozzle-receiving aperture 20IA as suggested in FIGS. 3A and 3B.

Filler pipe closure 10 also includes an outer door-closing spring 23 for yieldably pivoting outer flapper door 22 about outer door-pivot axis 22A normally to assume the closed position and an inner door-closing spring 25 for yieldably pivoting inner flapper door 24 about inner door-pivot axis 24A normally to assume the closed position. While outer door-closing spring 23 is mounted on outer door-support pin 22P and arranged to engage outer flapper door 22 as suggested in FIGS. 3A and 3B, inner door-closing spring 25 is not mounted on inner door-support pin 24P. Instead, in accordance with the present disclosure, inner door-closing spring 25 is mounted on a separate spring-support pin 25P that is located in spaced-apart relation to inner door-support pin 24P as suggested in FIGS. 3A and 3B.

Spring-support pin 25P is configured to extend into a pin-receiver 25R formed in inner section 20I of nozzle-insertion housing 20 as suggested in FIGS. 3A and 3B. Inner door-closing spring 25 is arranged to engage a portion of inner flapper door 24A as suggested in FIG. 3A.

A capless filler pipe closure 10 for a fuel filler pipe 14 associated with a vehicle fuel tank 16 includes an outer module M1 and an inner module M2 as suggested in FIGS. 2, 3, and 3B. Inner module M2 is separate from outer module M1 as suggested in FIG. 3B. Outer module M1 is formed to include an outer nozzle-receiving aperture 20OA and sized to extend into a fuel-conducting passageway 15 of fuel filler pipe 14 as shown in FIG. 3A. Outer module is M1 is configured to include a movable outer flapper door 22 that is arranged normally to close the outer nozzle-receiving aperture 20OA as suggested in FIGS. 3A and 3B. Inner module M2 is formed to include an inner nozzle-receiving aperture 20IA and sized to lie in the fuel-conducting passageway 15 of fuel filler pipe 14 as suggested in FIGS. 3A and 3B. Inner module M2 is configured to include a movable inner flapper door 24 that is arranged normally to close the inner nozzle-receiving aperture 20IA in a position that is below and in spaced-apart relation to the outer module M1 as suggested in FIGS. 3A and 3B.

Outer module M1 includes an outer section 20O formed to include the nozzle-receiving aperture 20OA, a separate middle section 20M, and a door-pivot pin 22P that is adapted to be inserted into pin receiver 22R formed in middle section 22M as suggested in FIG. 3B. Door-pivot pin 22P is coupled to middle section 20M using pin receiver 22R to support the movable outer flapper door 22 for pivotable movement about an outer door-pivot axis 22A from a closed position closing the outer nozzle-receiving aperture and an opened position opening the outer nozzle-receiving opening as suggested in FIGS. 3A and 3B. Center portion 20C of outer section 20O of outer module M1 is joined to inner module M2 by a laser weld (W) in accordance with the present disclosure as suggested in FIG. 3A.

Outer section 20O of outer module M1 includes a center portion 20C formed to include the outer nozzle-receiving aperture 20OA and a rim portion 20R as shown in FIGS. 3A and 3B. Rim portion 20R is arranged as shown in FIG. 3A to surround the center portion 20C and trap an outer end 14E of fuel filler pipe 14 therebetween when outer section 20O is mounted on the fuel filler pipe 14 to position outer and inner modules M1, M2 in fuel-conducting passageway 15 of fuel-filler pipe 14 as shown in FIG. 3A. Outer section 20O of outer module M1 also includes a series of frangible circumferentially spaced-apart break-away segments (F) coupled at one end to center portion 20C and at another end to rim portion 20R as suggested in FIGS. 2-3B.

A downwardly facing surface 20CD of center portion 20C of outer section 20O of outer module M1 is arranged to engage an upwardly facing surface 20MV of middle section 20M of outer module M1 as suggested in FIGS. 3A and 3B. Center portion 20C includes a downwardly extending strip 20CS as shown in FIGS. 3A and 3B. Capless filler pipe closure 10 also includes a laser weld (W) that is used to join the downwardly extending strip 20CS of the center portion 20C of the outer section 20O to the inner section 20I as suggested in FIG. 3A.

The downwardly extending strip 20CS of center portion 20C of outer section 20O is interposed between the middle section 20I and an upwardly extending strip 20ID of inner section 20I as shown in FIG. 3A. The upwardly extending strip 20ID of inner section 20I is coupled to an underlying inner door-support foundation 20IF also included in inner section 20I as shown in FIG. 3B. The downwardly extending strip 20CS of center portion 20C of outer section 20O includes a radially inwardly facing surface RI mating with a radially outwardly facing surface RO of middle section 20M. The downwardly extending strip 20CS also includes a radially outwardly facing surface 2RO mating with a radially inwardly facing surface 2RI of upwardly extending strip 20ID of inner section 20I as suggested in FIGS. 3A and 3B.

The outer section 20O, middle section 20M, and inner section 20I cooperate as suggested in FIGS. 3 and 34A to form a nozzle-insertion housing 20 that is formed to include an outer chamber 20I extending between the outer and inner nozzle-receiving apertures 20OA, 20IA and defining a portion of the nozzle-receiving passageway 15 formed in nozzle-insertion housing 20. Fuel filler pipe 14 further includes laser weld (W) that is used to join center portion 20C of outer section 20O to inner section 20I of nozzle-insertion housing 20 as suggested in FIG. 3A.

Outer module M1 further comprises a door-support foundation M1F and an underlying nozzle-guide base M1B coupled to door-support foundation M1F as shown in FIG.

3B. Door-support foundation M1F is configured as suggested in FIGS. 3A and 3B to support the movable outer flapper door 22 for pivotable movement about an outer door-pivot axis 22A from a closed position engaging the center portion 20C of the outer section 20O to close the outer nozzle-receiving aperture 20OA to an opened position disengaging the center portion 20C of the outer section 20O to open the outer nozzle-receiving aperture 20OA. Door-support foundation M1F comprises an upper frame M1FU coupled to nozzle-guide base M1B and formed to include a pin receiver 22R for receiving outer door-support pin 22P as suggested in FIGS. 3A and 3B. Door-support frame M1F also includes the outer door-support pin 22P that extends into pin receiver 22R as suggested in FIGS. 3A and 3B.

Center portion 20C of outer section 20O includes a ring 20R that is formed to include the outer nozzle-receiving aperture 20OA as suggested in FIGS. 3A and 3B. Ring 20R is coupled to the series of frangible break-away segments (F) as suggested in FIGS. 3, 3A and 3B.

Center portion 20C of outer section 20O further includes a downwardly extending strip 20CS that is arranged to face outwardly toward a radially inwardly facing surface RI of upwardly extending strip 20ID of inner module M2 as suggested in FIGS. 3A and 3B. Downwardly extending strip 20CS is also arranged to face inwardly toward a radially outwardly facing surface RO of nozzle-guide base M1B as suggested in FIGS. 3A and 3B. Laser weld (W) is arranged to join the downwardly extending strip 20CS of center portion 20P to inner module M2.

Figure 4:
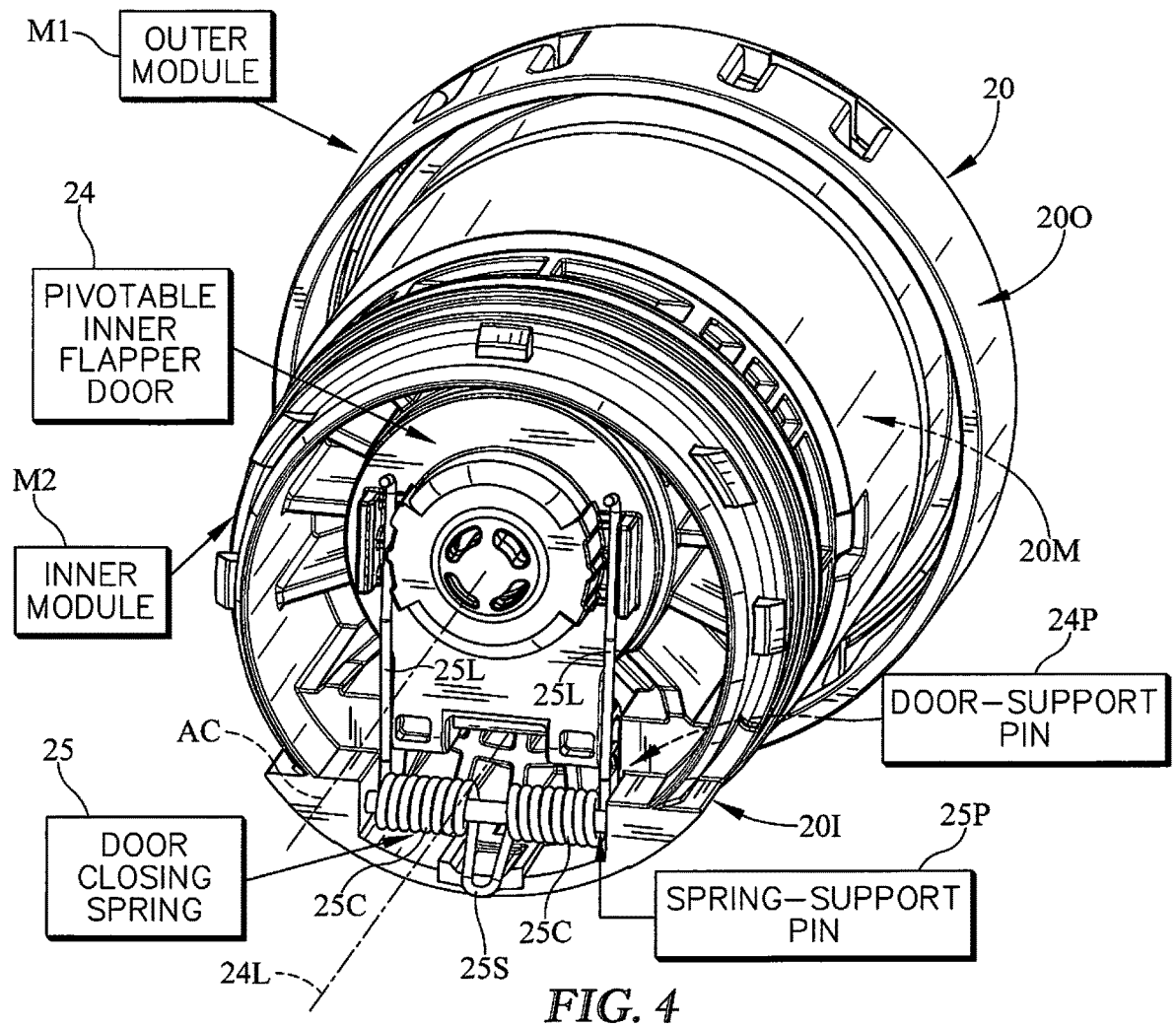
FIG. 4 is a perspective view of the underside of the spring-biased inner flapper door of FIG. 3 showing that the door-closing spring associated with the pivotable inner flapper door includes a helically wound energy-storage unit comprising sixteen coils mounted on a spring-support pin, a relatively short first leg coupled to a middle portion of the helically wound energy-storage unit and arranged to engage the nozzle-insertion housing, and a pair of relatively longer second legs coupled to outer portions of the helically wound energy-storage unit and arranged to engage the inner flapper door to apply a door-closing force to the inner flapper door.

Inner door-closing spring 25 is a torsion spring comprising a helically wound energy-storage unit 25U, a short leg 25S coupled to the helically wound energy-storage unit 25U and arranged to engage nozzle-insertion housing 20, and a pair of relatively longer long legs 25L coupled to the helically wound energy-storage unit 25U and arranged to engage inner flapper door 24 as suggested in FIG. 4. Spring-support pin 25P is arranged to extend through an pin-receiving channel formed in the helically wound energy-storage unit 25U as suggested in FIGS. 3A and 4 to support door-closing spring 25 to apply a yieldable door-closing force to inner flapper door 24 and to locate the helically wound energy-storage unit 25U of torsion spring 25 in spaced-apart relation to inner flapper door 24 as suggested in FIGS. 3A and 4.

The helically wound energy-storage unit 25U of inner door-closing spring 25 comprises sixteen coils 25C arranged to form two separate groups of eight coils 25C separated by the short leg 25S of inner door-closing spring 25 as shown, for example, in FIG. 4. Mounting inner door-closing spring 25 on a spring-support pin 25P that is separated from the inner door-support pin 24P on which the pivotable inner door flap 24 is mounted provides more space to hold extra coils 25C as suggested in FIG. 4.

The spring-loaded nozzle-actuated outer flapper door 22 is located in an outer end of nozzle-insertion housing 20 and yieldably biased to assume a closed position closing an outer nozzle-receiving aperture 20OA formed in nozzle-insertion housing 20 as shown in FIG. 3A. The spring-loaded inner flapper door 24 is yieldably biased to assume a closed position closing an inner nozzle-receiving aperture 20IA formed in a middle section 20M of nozzle-insertion housing 20 and arranged to lie in spaced-apart relation to outer flapper door 22 to define an outer chamber 201 of nozzle-insertion housing as shown in FIG. 3A. An overflow-capture-and-drainage system 30 is configured in accordance with the present disclosure to conduct any conduct liquid fuel extant above a closed inner flapper door 24 through an inner chamber 202 formed in nozzle-insertion housing 20 into a fuel-conducting passageway 15 formed in fuel filler pipe 14 for delivery to fuel tank 16.

Door-support foundation M1F includes a pad (P) as shown in FIG. 3. Pad (P) is included in upper frame M1FU of door-support foundation M1F and is arranged to engage a downwardly facing surface of center portion 20C of outer section 20O as shown in FIG. 3A.

Nozzle-guide base M1B includes an upwardly facing surface 20MU shown in FIG. 3B. Upwardly facing surface 20MU is arranged to engage a second downwardly facing surface of the center portion 20C of outer section 20O as shown in FIG. 3A.

An outer section 20O of nozzle-insertion housing 20 is formed to include a center portion 203, a rim portion 204 arranged to surround center portion 203 to trap an outer end of fuel filler pipe 14 therebetween, and a series of frangible circumferentially spaced-apart break-away segments (F) coupled at one end to center portion 203 and at another end to rim portion 204 as suggested in FIGS. 2 and 3A. A laser weld (W) is used to join center portion 203 of the outer section 20O of nozzle-insertion housing 20 to an inner section 20I of the nozzle-insertion housing 20 that is used to support the pivotable inner flapper door 24. The pivotable inner flapper door 24 is configured and arranged to include a hidden leading door edge 205 to minimize damage to the pivotable inner flapper door 24 as the fuel-dispensing pump nozzle 18 is inserted into the capless filler pipe closure 10 to dispense liquid fuel into a fuel-conducting passageway 15 formed in fuel filler pipe 14 and arranged to lead to a fuel tank 16.

A spring-support pin 25 used to support a torsion spring 25 associated with inner flapper door 24 is decoupled from door-pivot axis 24A of the pivotable inner flapper door 24. Such decoupling locates the door-pivot axis 24A of the pivotable inner flapper door 24 between the door-pivot axis 22A of the pivotable outer flapper door 22 and the spring-support pin 25P associated with the inner flapper door 24.

An exploded assembly view of the component shown in FIG. 3A is provided in FIG. 3B to suggest that outer and middle sections 20O, 20M of the nozzle-insertion housing 20 cooperate with a spring-loaded outer flapper door 22 to form an outer module M1 of filler pipe closure 10. An inner section 20I of nozzle-insertion housing 20 cooperates with a spring-loaded inner flapper door 24 to form an inner module M2 of filler pipe closure 10 as suggested in FIG. 3B.

An overflow-capture-and-drainage system 30 of filler pipe closure 10 is arranged to lie under the inner and outer modules M2, M1 when the components are assembled as shown in FIG. 3A. During insertion of a fuel-dispensing pump nozzle 18 into the capless system 10 to open the spring-biased outer and inner flapper doors 22, 24, any overflow liquid fuel extant in outer chamber 201 above the aspirator opening in the fuel-dispensing pump nozzle 18 that is discharged outwardly through the opened spring-biased inner flapper door 24 will fall under gravity into overflow reservoirs 302 formed in the overflow-capture-and-drainage system 30 located inside the fuel-tank filler pipe 14 and then exit those overflow reservoirs 302 through reservoir-drain holes 304 to flow through an overflow drainage conduit 306 provided in the inner chamber 202 downwardly into the fuel-conducting passageway 15 that leads to the fuel tank 16. The overflow-capture-and-drainage system 30 is formed to include ten top-opening overflow reservoirs 302 in an illustrative embodiment. Each overflow reservoir 302 is bounded, in part, by a bottom wall 302W formed to include a reservoir-drain hole 304 that opens into the overflow drainage conduit 306 that leads into the fuel filler pipe 14.

Figure 6:
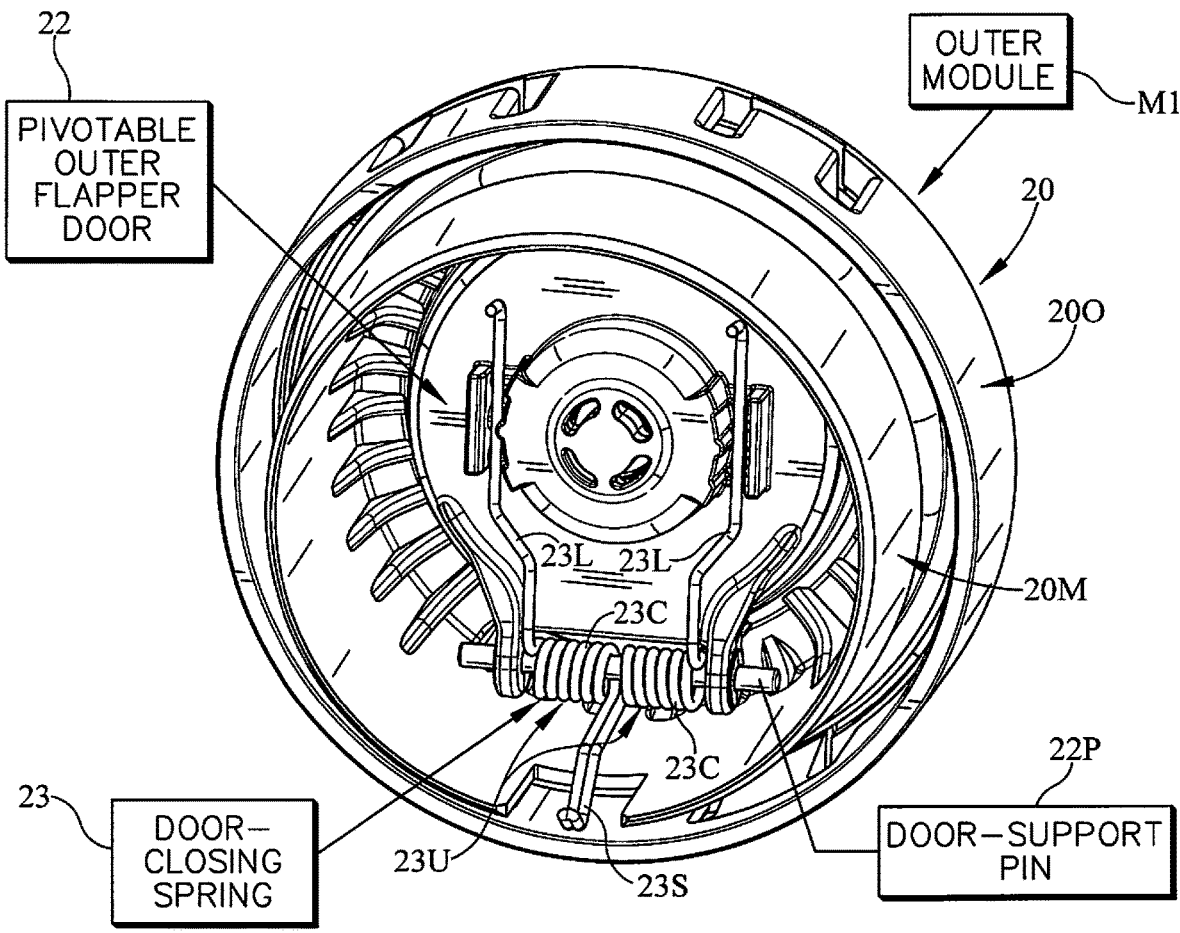
FIG. 6 is a perspective view of the underside of the spring-biased outer flapper door of FIG. 3 showing that the door-closing spring associated with the pivotable outer flapper door includes a helically wound energy-storage unit comprising twelve coils mounted on a door-support pin for the pivotable outer flapper door.

An underside of the spring-biased inner flapper door 24 is illustrated in FIG. 4 to reveal that the door-closing spring 25 associated with the pivotable inner flapper door 24 includes a helically wound energy-storage unit 25U comprising sixteen coils 25C mounted on a spring-support pin 25P, a relatively short first leg 25S coupled to a middle portion of the helically wound energy-storage unit 25U and arranged to engage the nozzle-insertion housing 20, and a pair of relatively longer second legs 20L coupled to outer portions of the helically wound energy-storage unit 25U and arranged to engage the inner flapper door 24 to apply a door-closing force to the inner flapper door 24. The spring-biased outer flapper door 22 is illustrated in FIG. 6 to reveal that the door-closing spring 23 associated with the pivotable outer flapper door 22 includes a helically wound energy-storage unit 23U comprising twelve coils 23C mounted on a door-support pin 22P for the pivotable outer flapper door 22.

Figure 5:
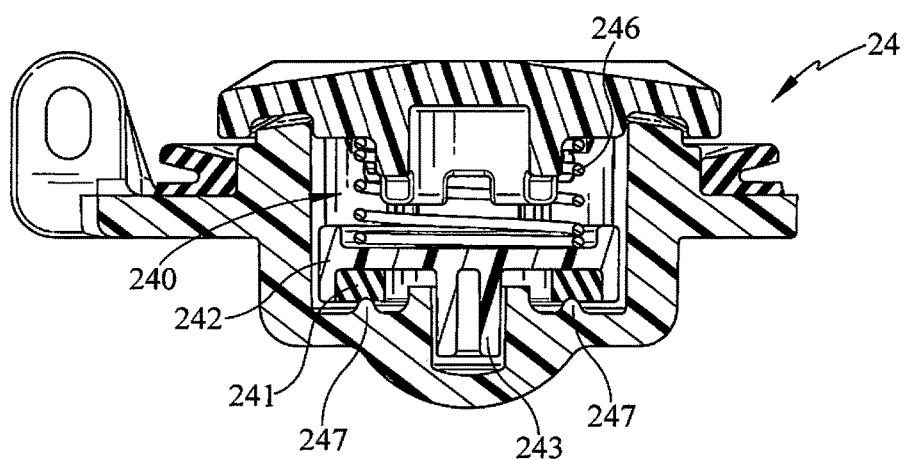
FIG. 5 is an enlarged sectional view of the inner flapper door to illustrate that such door includes a spring-loaded pressure-relief valve comprising a downwardly facing over-molded sealing ring carried on a ring-support disk, a downwardly extending valve stem coupled to an underside of the ring-support disk, and a snap-on spring-support base above the ring-support disk that is configured to snap-onto an upwardly extending base-mount ring included in the inner flapper door.
Figure 5A:
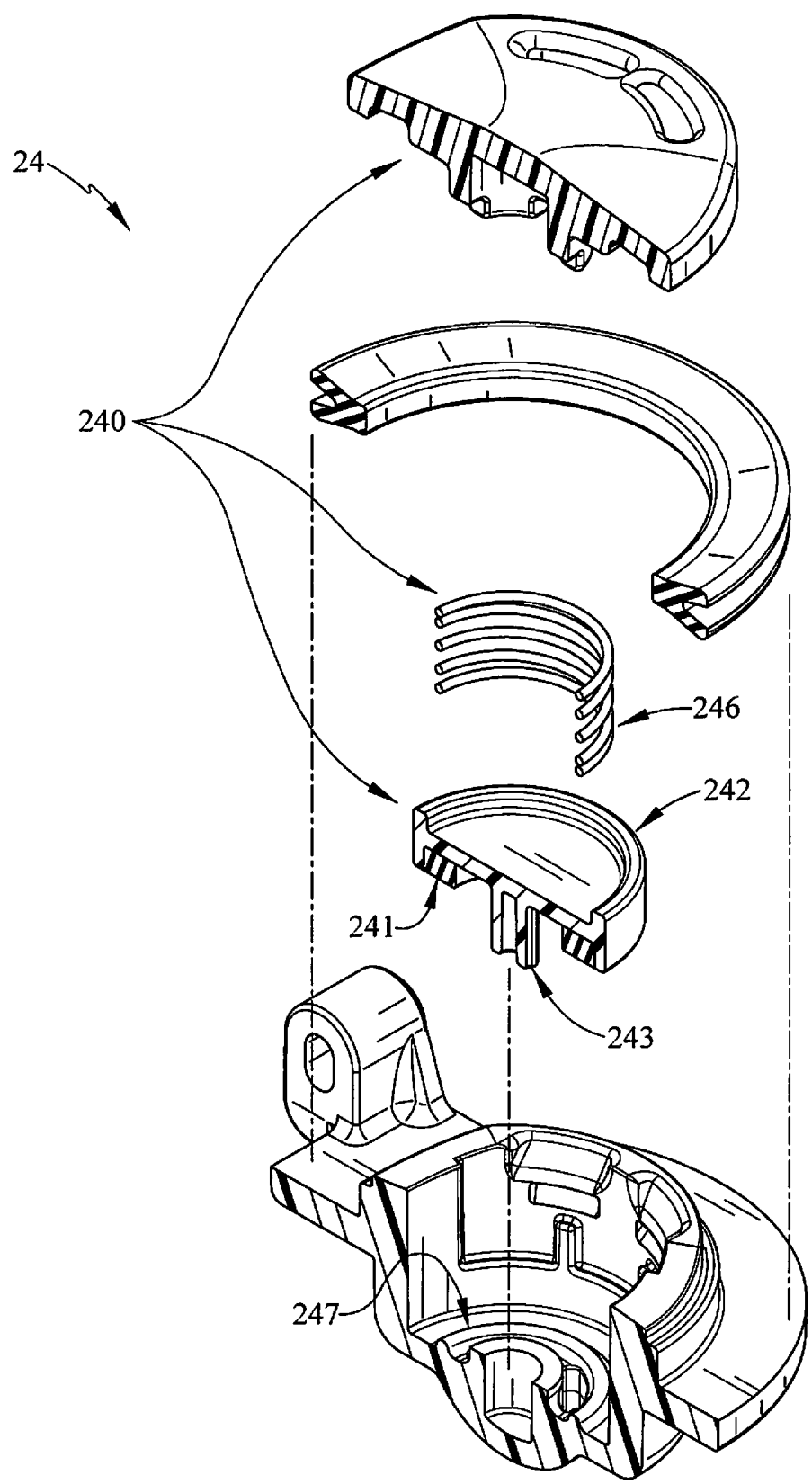
FIG. 5A is an exploded assembly view of the components that cooperate to form the inner aperture closure shown in FIG. 5.

An enlarged sectional view of the inner flapper door 24 is provided in FIG. 5 to illustrate that inner flapper door 24 includes a spring-loaded pressure-relief valve 240 comprising a downwardly facing overmolded sealing ring 241 carried on a ring-support disk 242, a downwardly extending valve stem 242 coupled to an underside of ring-support disk 242, and a snap-on, spring-support base 244 above ring-support disk 242. The snap-on, spring-support base 244 is configured to snap onto an upwardly extending base-mount ring 245 included in inner flapper door 24. A coiled compression spring 246 acts between base 244 and disk 242 to yieldably urge sealing ring to engage a valve seat 247.

Figure 7:
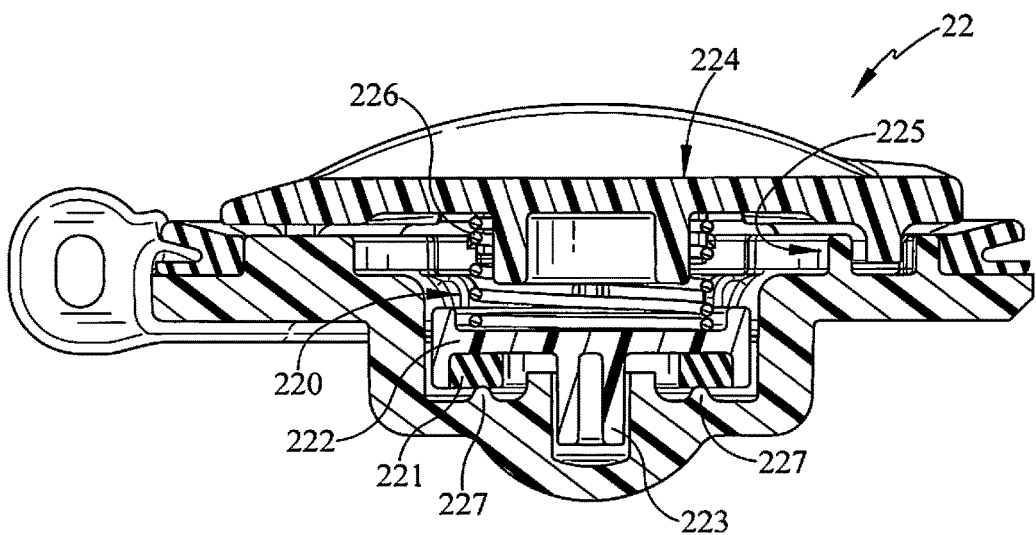
FIG. 7 shows an enlarged sectional view of the outer flapper door to illustrate that such door includes a spring-loaded pressure-relief valve comprising a downwardly facing overmolded sealing ring carried on a ring-support disk, a downwardly extending valve stem coupled to an underside of the ring-support disk, and a snap-on spring-support base above the ring-support disk that is configured to snap-onto an upwardly extending base-mount ring included in the outer flapper door.
Figure 7A:
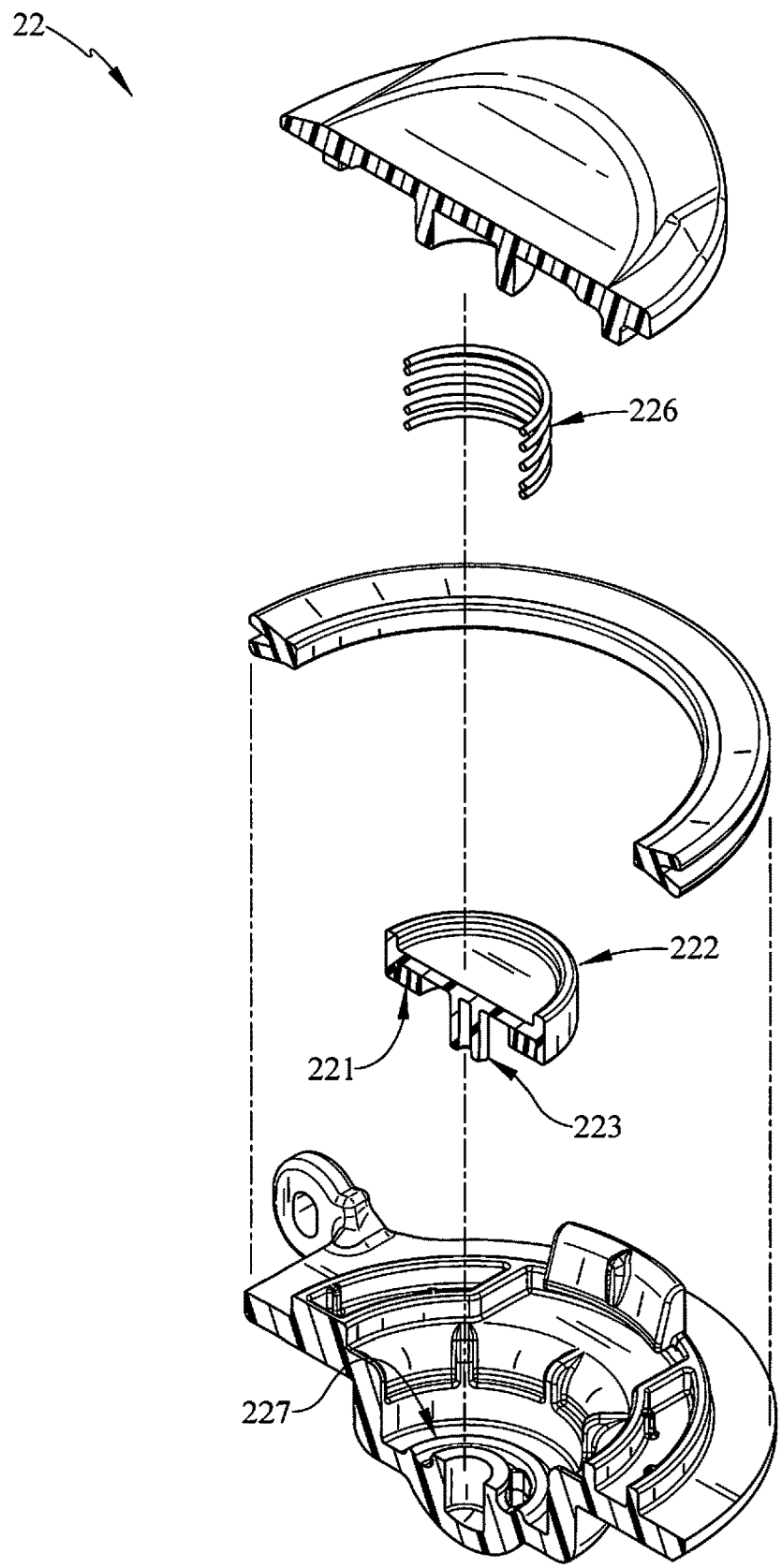
FIG. 7A is an exploded assembly view of the components that cooperate to form the outer-aperture closure shown in FIG. 7.

An enlarged sectional view of the outer flapper door 22 is provided in FIG. 7 to illustrate that outer flapper door 22 includes a spring-loaded pressure-relief valve 220 comprising a downwardly facing overmolded sealing ring 221 carried on a ring-support disk 222, a downwardly extending valve stem 223 coupled to an underside of ring-support disk 222, and a snap-on spring-support base 224 above the ring-support disk 222. The snap-on, spring-support base 224 is configured to snap onto an upwardly extending base-mount ring 225 included in the outer flapper door 22. A coiled compression spring 226 acts between base 224 and disk 222 to yieldably urge sealing ring 221 to engage a valve seat 227.

A filler pipe closure 10 for a fuel filler pipe 14 associated with a vehicle fuel tank 16 is shown in FIGS. 1 and 2. Filler pipe closure 10 includes a nozzle-insertion housing 20 that is formed to include a nozzle-receiving aperture 20IR and sized to extend into a fuel-conducting passageway 15. Nozzle-insertion housing 20 includes an inner door-support pin 24 and a spring-support pin 25 arranged to lie in spaced-apart relation to inner door-support pin 24P. Inner flapper door 24 is mounted on door-support pin 24P for pivotable movement relative to nozzle-insertion housing 20 from a closed position closing the inner nozzle-receiving aperture 20IR to an opened position opening the nozzle-receiving aperture 20IR. A door-closing spring 25S is mounted on spring-support pin 25P to lie in spaced-apart relation to inner door-support pin 24P and arranged to yieldably urge inner flapper door 24 to the closed position.

Door-closing spring 25 includes a helically wound energy-storage unit 25U, a first leg 25S coupled to the helically wound energy-storage unit 25U and arranged to engage nozzle-insertion housing 20, and a second leg 25L coupled to the helically wound energy-storage unit and arranged to engage inner flapper door 24 to apply a door-closing force to inner flapper door 24 normally to pivot inner flapper door 24 about the inner door-support pin 24P to the closed position closing the nozzle-receiving aperture 20IR as suggested in FIGS. 3 And 4. Spring-support pin 25P of nozzle-insertion housing 20 is arranged to extend through a pin-receiving channel 25C formed in the helically wound energy-storage unit 25U to locate door-closing spring 25S spaced-apart relation to inner door-support pin 24P as suggested in FIGS. 3A and 3B.

Nozzle-insertion housing 20 includes an aperture rim 20IR that is formed to include the nozzle-receiving aperture 20IA as shown in FIG. 3B. Aperture rim 20IR establishes a transverse reference plane TRP that extends through a space provided between inner door-support pin 24P and spring-support pin 25P as suggested in FIG. 3 to locate inner door-support pin 24P on one side of the transverse reference plane TRP and to locate spring-support pin 25P on an opposite side of the transverse reference plane TRP.

Aperture rim 20IR surrounds an axially extending aperture centerline AC that is normal to the transverse reference plane TRP as suggested in FIG. 3. Nozzle-insertion housing 20 includes an aperture rim 20IR that is formed to include the nozzle-receiving aperture 20IA and is arranged to surround the axially extending aperture centerline AC that extends through the nozzle-receiving aperture 20IA. Inner door-support pin 24P is located a first distance D1 from the axially extending aperture centerline as suggested in FIG. 3A. Spring-support pin 25P is located a relatively greater second distance D2 from the axially extending aperture centerline AC as suggested in FIG. 3A.

Door-support and spring-support pins 24P, 25P are arranged to lie in spaced-apart parallel relation to one another as suggested in FIG. 3B. The axially extending aperture centerline AC is arranged to lie in spaced-apart parallel relation to a reference line 24L that is perpendicular to inner door-support pin 24P as suggested in FIG. 4.

Nozzle-insertion housing 20 further includes a pin-support member 206 having an outer segment 207 formed to include an nozzle-receiving upstream channel 206C terminating at the nozzle-receiving aperture 20IA and an inner segment 208 formed to include a downstream nozzle-receiving channel 208C and coupled to outer segment 207 to place the upstream and downstream nozzle-receiving channels 206C, 208C in fluid communication with one another via the nozzle-receiving aperture 20IA. An O-ring seal 209 is mounted on an exterior portion of outer segment 207 as shown in FIG. 3B, inner door-support pin 24P is coupled to outer segment 207 of pin-support member 206. Spring-support pin 25P is coupled to inner segment 208 of pin-support member 206. Pin-support member 206 is illustratively a monolithic component made of a plastics material molded to include the door-support and spring-support pins 24P, 25P.

Outer segment of pin-support member of nozzle-insertion housing 20 is formed to provide the nozzle-receiving upstream channel 207C with a funnel-shaped nozzle inlet passageway 207C1, a wide-diameter outlet passageway 207C3 opening toward inner flapper door 24 when inner flapper door 24 occupies the closed position, and a relatively narrower narrow-diameter transition passageway 207C2 interconnecting the funnel-shaped nozzle inlet passageway 207C1 and the wide-diameter nozzle outlet 207C2 passageway 206C3 as shown in FIG. 3B. Outer segment 207 of pin-support member 206 includes an internal protrusion having a radially inwardly facing exterior boundary surface that faces toward the axially extending aperture centerline AC and defines a portion of boundary of the funnel-shaped nozzle inlet and narrow-diameter transition passageways 207C1, 207C2 and an axially inwardly facing exterior surface that faces toward inner flapper door 24 and defines a ceiling boundary of the wide-diameter nozzle outlet passageway 207C3. The radially inwardly facing exterior boundary surface and the axially inwardly facing exterior surface meet to establish a hidden leading door edge 205 arranged to minimize damage to inner flapper door 24 during insertion of a fuel-dispensing pump nozzle 18 into the nozzle-receiving aperture 20IA formed in nozzle-insertion housing 20.

Outer segment 207 includes a funnel wall 207F as shown in FIG. 3B. Funnel wall 207F bounds the funnel-shaped nozzle inlet passageway 207C1 to provide means for guiding a tip 18T of the fuel-dispensing pump nozzle 18 away from the door-support pin 24P during insertion of the fuel-dispensing pump nozzle 18 into nozzle-insertion housing 20 through the upstream nozzle-receiving channel 207C1, the nozzle-receiving aperture 20IA, and the downstream nozzle-receiving channel 207C3 so that damaging contact by the fuel-dispensing pump nozzle 18 and inner flapper door 24 is minimized.

Inner door-closing spring 25S comprises an helically wound energy-storage unit 25U. Energy-storage unit 25U comprises several coils 25C mounted on the spring-support pin to lie in spaced-apart relation to inner flapper door 24 to provide a separation space between the door-support pin and the energy-storage unit 25U to receive portions of the coils 25C and maximize the number of coils 25C included in the helically wound energy-storage unit 25U.

The invention claimed is:

1. A capless filler pipe closure for a fuel filler pipe associated with a vehicle fuel tank, the filler pipe closure comprising
   an outer module formed to include an outer nozzle-receiving aperture, sized to extend into a fuel-conducting passageway of a fuel filler pipe, and configured to include a movable outer flapper door arranged normally to close the outer nozzle-receiving aperture, and
   a separate inner module formed to include an inner nozzle-receiving aperture, sized to lie in the fuel-conducting passageway of the fuel filler pipe, and configured to include a movable inner flapper door that is arranged normally to close the inner nozzle-receiving aperture and to lie in a position that is below and in spaced-apart relation to the outer module,
   wherein the outer module includes an outer section formed to include the outer nozzle-receiving aperture, a separate middle section, and a door-support pin mounted in a pin receiver formed in the separate middle section and arranged to support the movable outer flapper door for pivotable movement about a pivot axis established by the door-support pin to open and close the outer nozzle-receiving aperture,
   wherein the separate middle section is interposed between the inner module and the outer section of the outer module, and
   wherein the separate middle section includes a pad arranged to engage a first downwardly facing surface of a center portion of the outer section and an upwardly facing surface that is arranged to engage a second downwardly facing surface of the center portion of the outer section.

2. The capless filler pipe closure of claim 1, wherein the outer module further includes a door-support foundation and an underlying nozzle-guide base coupled to the door-support foundation, the door-support foundation is configured to support the movable outer flapper door for pivotable movement about the pivot axis from a closed position engaging the center portion of the outer section to close the outer nozzle-receiving aperture to an opened position disengaging the center portion of the outer section to open the outer nozzle-receiving aperture, the center portion of the outer section includes a ring that is formed to include the outer nozzle-receiving aperture and coupled to the series of frangible break-away segments, the center portion of the outer section further includes a downwardly extending strip that is coupled to the ring and arranged to face outwardly toward a radially inwardly facing surface of the inner module and inwardly toward a radially outwardly facing surface of the nozzle-guide base and wherein the laser weld is arranged to join the downwardly extending strip of the center portion to the inner module.

3. The capless filler pipe closure claim 1, wherein the outer section, the middle section, and the inner section cooperate to form a nozzle-insertion housing that is formed to include an outer chamber extending between the outer and inner nozzle-receiving apertures and defining a portion of a nozzle-receiving passageway formed in the nozzle-insertion housing.

4. The capless filler pipe closure of claim 3, further comprising a laser weld used to join the center portion of the outer section to the inner section of the nozzle-insertion housing.

5. The capless filler pipe closure of claim 1, wherein the center portion of the outer section includes a downwardly extending strip and further comprising a laser weld that is used to join the downwardly extending strip of the center portion of the outer section.

6. The capless filler pipe closure of claim 5, wherein a downwardly facing surface of the center portion of the outer section is arranged to lie in a radially inward position relative to the downwardly extending strip to engage the upwardly facing surface of the separate middle section.

7. The capless filler pipe closure of claim 5, wherein the downwardly extending strip of the center portion of the outer section is interposed between the middle section and an upwardly extending strip of the inner section.

8. The capless filler pipe closure of claim 7, wherein the downwardly extending strip of the center portion of the outer section includes a radially inwardly facing surface mating with a radially outwardly facing surface of the middle section and a radially outwardly facing surface mating with a radially inwardly facing surface of the inner section.

9. A capless filler pipe closure for a fuel filler pipe associated with a vehicle fuel tank, the filler pipe closure comprising
   an outer module formed to include an outer nozzle-receiving aperture, sized to extend into a fuel-conducting passageway of a fuel filler pipe, and configured to include a movable outer flapper door arranged normally to close the outer nozzle-receiving aperture, and
   a separate inner module formed to include an inner nozzle-receiving aperture, sized to lie in the fuel-conducting passageway of the fuel filler pipe, and configured to include a movable inner flapper door that is arranged normally to close the inner nozzle-receiving aperture and to lie in a position that is below and in spaced-apart relation to the outer module,
   wherein the outer module includes an outer section formed to include the outer nozzle-receiving aperture, a separate middle section, and an outer door-pivot pin coupled to the middle section to support the movable outer flapper door for pivotable movement about an outer door-pivot axis from a closed position closing the outer nozzle-receiving aperture to an opened position opening the outer nozzle-receiving opening, and wherein the outer section includes a center portion formed to include the outer nozzle-receiving aperture, a rim portion arranged to surround the center portion and trap an outer end of the fuel filler pipe therebetween when the outer section is mounted on the fuel filler pipe to position the outer and inner modules in the fuel-conducting passageway of the fuel filler pipe, and a series of frangible circumferentially spaced-apart break-away segments coupled at one end to the center portion and at another end to the rim portion.

10. The capless filler pipe closure of claim 9, wherein a downwardly facing surface of the center portion of the outer section is arranged to engage an upwardly facing surface of the separate middle section.

11. The capless filler pipe closure claim 9, wherein the outer section, the middle section, and the inner section cooperate to form a nozzle-insertion housing that is formed to include an outer chamber extending between the outer and inner nozzle-receiving apertures and defining a portion of a nozzle-receiving passageway formed in the nozzle-insertion housing.

12. The capless filler pipe closure of claim 11, further comprising a laser weld used to join the center portion of the outer section to the inner section of the nozzle-insertion housing.

13. The capless filler pipe closure of claim 9, wherein the center portion of the outer section includes a downwardly extending strip and further comprising a laser weld that is used to join the downwardly extending strip of the center portion of the outer section.

14. The capless filler pipe closure of claim 13, wherein a downwardly facing surface of the center portion of the outer section is arranged to lie in a radially inward position relative to the downwardly extending strip to engage an upwardly facing surface of the separate middle section.

15. The capless filler pipe closure of claim 13, wherein the downwardly extending strip of the center portion of the outer section is interposed between the middle section and an upwardly extending strip of the inner section.

16. The capless filler pipe closure of claim 15, wherein the downwardly extending strip of the center portion of the outer section includes a radially inwardly facing surface mating with a radially outwardly facing surface of the middle section and a radially outwardly facing surface mating with a radially inwardly facing surface of the inner section.

17. A capless filler pipe closure for a fuel filler pipe associated with a vehicle fuel tank, the filler pipe closure comprising an outer module formed to include an outer nozzle-receiving aperture, sized to extend into a fuel-conducting passageway of a fuel filler pipe, and configured to include a movable outer flapper door arranged normally to close the outer nozzle-receiving aperture, and a separate inner module formed to include an inner nozzle-receiving aperture, sized to lie in the fuel-conducting passageway of the fuel filler pipe, and configured to include a movable inner flapper door that is arranged normally to close the inner nozzle-receiving aperture and to lie in a position that is below and in spaced-apart relation to the outer module, wherein the outer module comprises an outer section including a center portion formed to include the outer nozzle-receiving aperture, a rim portion arranged to surround the center portion and trap an outer end of the fuel filler pipe therebetween when the outer section is mounted on the fuel filler pipe, and a series of frangible break-away segments coupled at one end to the center portion and at another end to the rim portion.

18. The capless filler pipe closure of claim 17, further comprising a laser weld arranged to join the center portion of the outer section to the inner module.

19. The capless filler pipe closure of claim 17, wherein the outer module further includes a door-support foundation and an underlying nozzle-guide base coupled to the door-support foundation, the door-support foundation is configured to support the movable outer flapper door for pivotable movement about an outer door-pivot axis from a closed position engaging the center portion of the outer section to close the outer nozzle-receiving aperture to an opened position disengaging the center portion of the outer section to open the outer nozzle-receiving aperture, the center portion of the outer section includes a ring that is formed to include the outer nozzle-receiving aperture and coupled to the series of frangible break-away segments, the center portion of the outer section further includes a downwardly extending strip that is coupled to the ring and arranged to face outwardly toward a radially inwardly facing surface of the inner module and inwardly toward a radially outwardly facing surface of the nozzle-guide base and wherein the laser weld is arranged to join the downwardly extending strip of the center portion to the inner module.

20. The capless filler pipe of claim 19, wherein the door-support foundation includes a pad arranged to engage a first downwardly facing surface of the center portion of the outer section and the nozzle-guide base includes an upwardly facing surface that is arranged to engage a second downwardly facing surface of the center portion of the outer section.

* * * * *